May 30, 1967

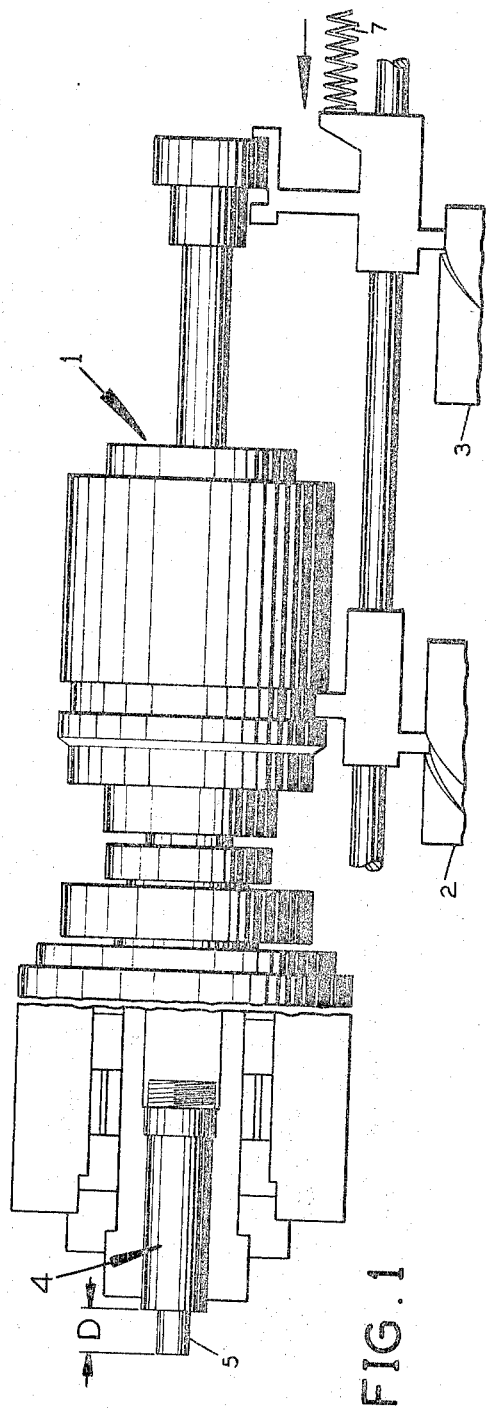
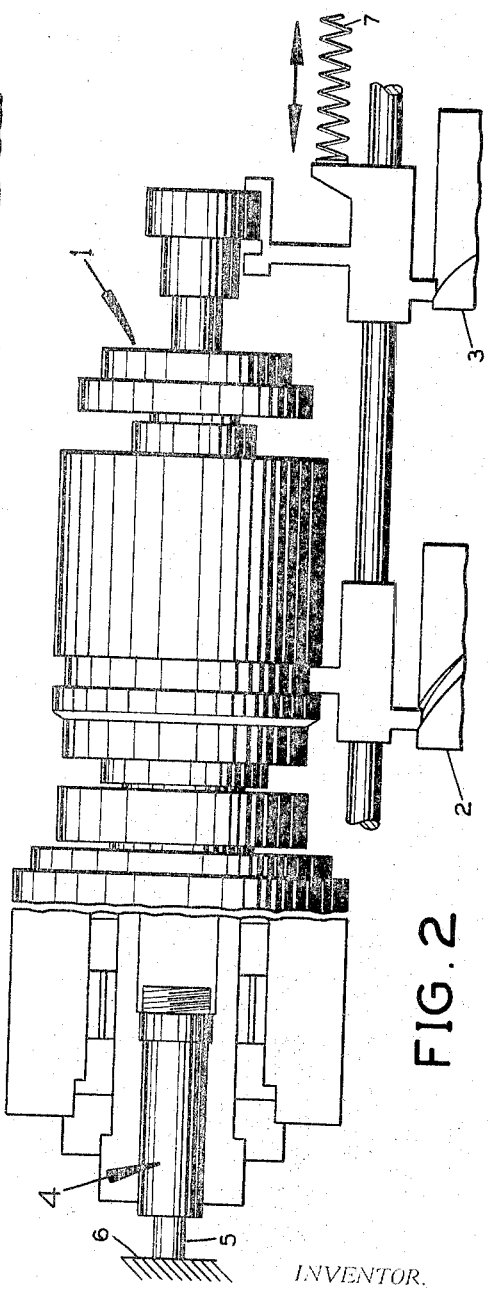

P. DUCANIS 3,322,317

MECHANISM FOR SEQUENTIALLY FEEDING BARS
OF UNIFORM CROSS SECTION IN A MACHINE

Filed Sept. 23, 1965

INVENTOR.
PAUL DUCANIS
BY
Lloyd J. Andres

May 30, 1967  P. DUCANIS  3,322,317
MECHANISM FOR SEQUENTIALLY FEEDING BARS
OF UNIFORM CROSS SECTION IN A MACHINE
Filed Sept. 23, 1965  4 Sheets-Sheet 3

INVENTOR.
PAUL DUCANIS
BY
Lloyd Andrews

May 30, 1967

P. DUCANIS 3,322,317

MECHANISM FOR SEQUENTIALLY FEEDING BARS
OF UNIFORM CROSS SECTION IN A MACHINE

Filed Sept. 23, 1965

INVENTOR.
PAUL DUCANIS
BY
*Lloyd J. Andres*

United States Patent Office 3,322,317
Patented May 30, 1967

3,322,317
MECHANISM FOR SEQUENTIALLY FEEDING BARS OF UNIFORM CROSS SECTION IN A MACHINE
Paul Ducanis, 1520 NE. 103rd St., Miami Shores, Fla. 33153
Filed Sept. 23, 1965, Ser. No. 489,689
10 Claims. (Cl. 226—167)

This invention relates in general to automatic or semi-automatic machines for machining or processing bars of material of various shapes having uniform cross section and more particularly a feed mechanism adapted and constructed to be reciprocated, and through which bar stock is sequentially fed predetermined like distances for various operations.

Prior devices of this general character, commonly known as feed-finger apparatus, depended upon pluralities of jaws for gripping or clamping and moving bar stock predetermined distances either against a stop or by the movement through positively driven distances. These forms of feed apparatus are complicated, complex in operation and expensive to manufacture to close tolerances, and in practice, often fail for several reasons, including premature wear, which results in either a shutdown of the machine in which they are used or a mal-formation of the parts of the bar being work.

The present invention overcomes the above objections and disadvantages by the provision of a relatively simple feed mechanism comprising a group of elements which are adapted to sequentially and precisely feed bar stock when operated by the normal mechanical means in automatic machines and in addition to being relatively low in cost has been found to have a high degree of accuracy and reliability and comparatively long life as compared to prior devices.

A principal object of the invention is the provision of a feed cylinder for conventional automatic screw machines which depends upon the canting movement of a plurality of rings for gripping and feeding bar stock through the inside diameter thereof and precisely disengaging the stock for a subsequent reciprocation.

A further object of the invention is the provision of an adaptor element for accepting interchangeable feed mechanisms incorporating tiltable locking means dimensioned for feeding bar stock having uniform cross section and of different shape and size.

A further object of the invention is the provision of a bar stock feed apparatus in which an edgewise wound coil spring of rectangular cross section is used as the tilting locking element instead of a plurality of tiltable rings.

Another object of the invention is the provision of a positive feed mechanism for a screw machine which will either sequentially move bar stock against a stop or by a predetermined sequential movement through a precise dimension without a stop.

These and other objects and advantages in two embodiments of the invention are described and shown in the following specification and drawings, in which:

FIG. 1 is a fragmentary view of a machine in which a cylindrical bar stock has been fed by the mechanism a predetermined distance for machining.

FIG. 2 is the same as FIG. 1, following the aforesaid machining with a second sequence of bar stock positioned against a stop.

Figure 3:
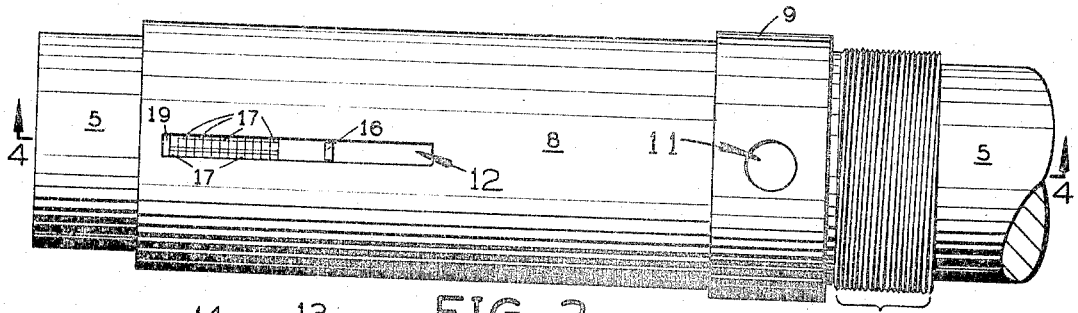
FIG. 3 is a side elevation of the feed apparatus shown in FIG. 1.

Referring to FIG. 1, the mechanism shown represents a typical bar stock feed mechanism 1 for an automatic screw machine, which is normally operated by collet cams 2 and stock feed cam 3, shown only in part.

The present stock gripping unit or feed and locking device 4 is self operating and is shown secured within the head of the feed mechanism, illustrating a projection of round bar stock 5 after having been fed through a distance D for machining. The feed distance D is either controlled by moving the bar stock against a stop or by the precise predetermined control of the feed mechanism cam means. FIG. 2 illustrates a stop means 6 and also illustrates the bar stock advance movement of cam 3 under the pressure of spring 7 in the automatic mechanism which operation is typical.

FIG. 3 is a plan view of the self locking feed device which is constructed and adapted to replace the conventional collets and feed fingers and like devices in conventional screw machines, which includes a cylindrical casing or housing 8 having a flange 9 and outside threads 10 at one end thereof. A hole 11 is positioned centrally through flange 9 for insertion and extraction of the device by a bar handle and an axial slot 12 is provided in the opposite end portion of the casing, as shown, for use to be hereinafter described. An internal keyway or channel may be substituted for the slot 12.

The casing 8 has a coaxial bore therethrough for slidably guiding the bar stock 5 of predetermined diameter. The casing 8 is further provided with a counter-bore 13 normal to the axis thereof and an internal snap ring groove 14 near the outer end of the bore.

Figure 4:
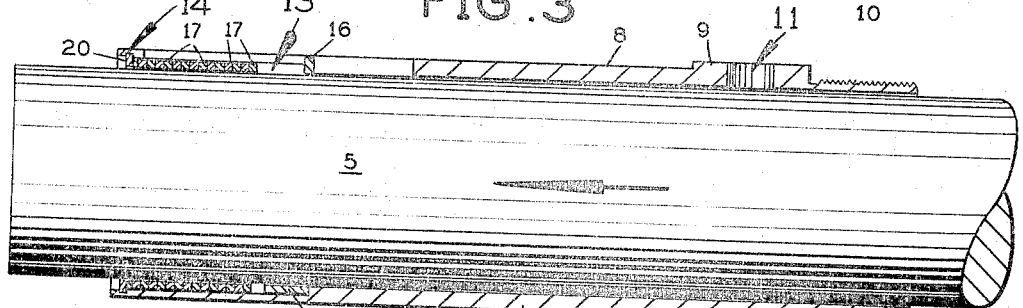
FIG. 4 is a cross sectional elevation taken through section line 4—4, FIG. 3.
Figure 5:
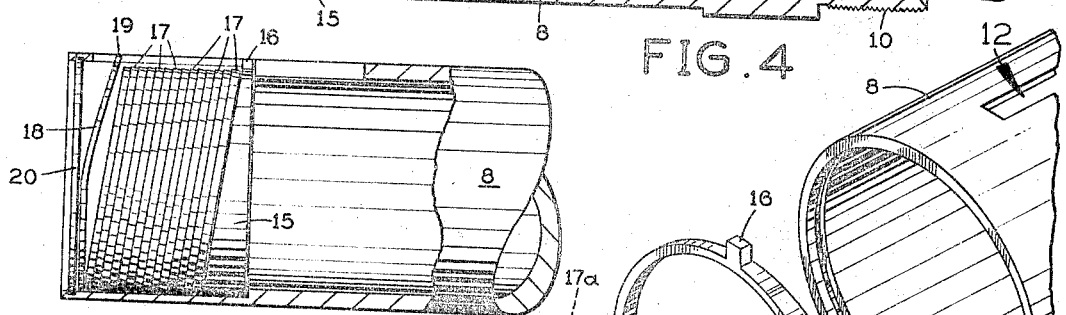
FIG. 5 is a fragmentary view of the mechanism shown in FIG. 3 with a portion thereof broken away.
Figure 6:
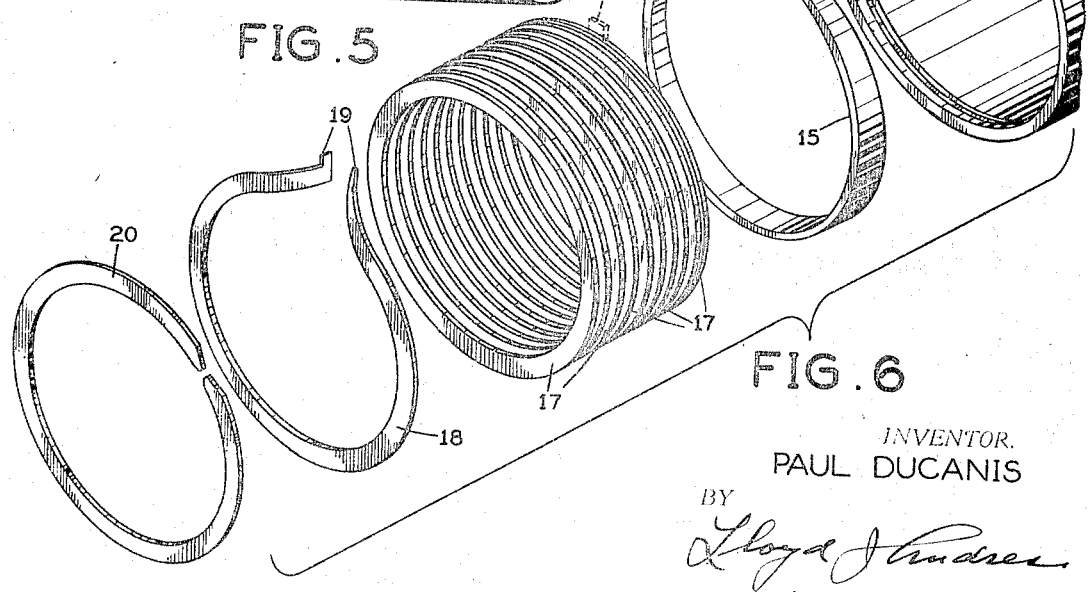
FIG. 6 is an exploded perspective view of elements shown in FIG. 3.

Referring to FIGS. 4, 5, and 6, an oblique canting ring 15, best shown in FIG. 6, is provided within the counter bore 13 against the shoulder thereof, as shown, and includes an integral projection 16 for loose engagement in slot or channel 12 for the prevention of rotation thereof. A plurality of rings 17 are provided with an outside diameter a predetermined dimension less than the counter-bore 13 and a predetermined dimension greater than the diameter of the bar stock 5. In this particular embodiment, fourteen of the rings 17 are positioned against each other within the counter-bore 13 with the innermost one against the oblique side of ring 15, as shown in FIG. 5. Each ring 17 may include an integral projection 17a, shown dotted in FIG. 6, for loose engagement in channel 12 for preventing the rotation of the rings.

A circular spring member 18, having a curved transverse form, has a pair of integral projections 19—19 retained in channel 12 with the spring positioned against the outermost one of rings 17 by an internal snap ring 20, as shown. Thus when the device is in idle position, all elements assume the positions shown in FIG. 5.

When a cylindrical bar of proper diameter is inserted in the bore of housing 8 in the direction shown by arrow in FIG. 4, it will slide through the inside diameter of each ring 17 against opposite inner edges thereof by the action of spring 18. The multiple internal corner engagement of opposite internal edges of each canted ring 17 on the outer surface of bar 5 and the abutting of said innermost ring against the ring 15 or the alternate pin 32 and the shoulder of the counter-bore, shown in FIG. 9, will prevent even the slightest reverse movement of the bar by virtue of the oblique locking action of all rings 17. Thus it is apparent that when the feed device is incorporated in a screw machine and the bar stock is sequentially fed equidistances through housing 8 it will be locked against opposite movement for each corresponding feed cycle.

The channel 12 is preferred to be a slot through housing 8 rather than an internal keyway since it provides an opening for the manual loosening of rings 17 when required. The hole 11 is provided for the convenient insertion of a handle for threading the housing into and out of the socket in the machine.

Figure 7:
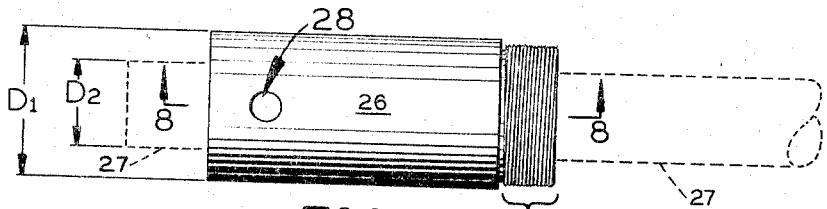
FIG. 7 is a side elevation of an adaptor for sequentially feeding bar stock of smaller diameter than the design parameter of a machine.

An important feature of the present invention also resides in its adaptability for utilizing the feed tubes or barrels of screw machines normally limited to certain large diameter bars, by the provision of an adaptor assembly, such as shown in FIG. 7, which in effect is a size reducer.

Figure 8:
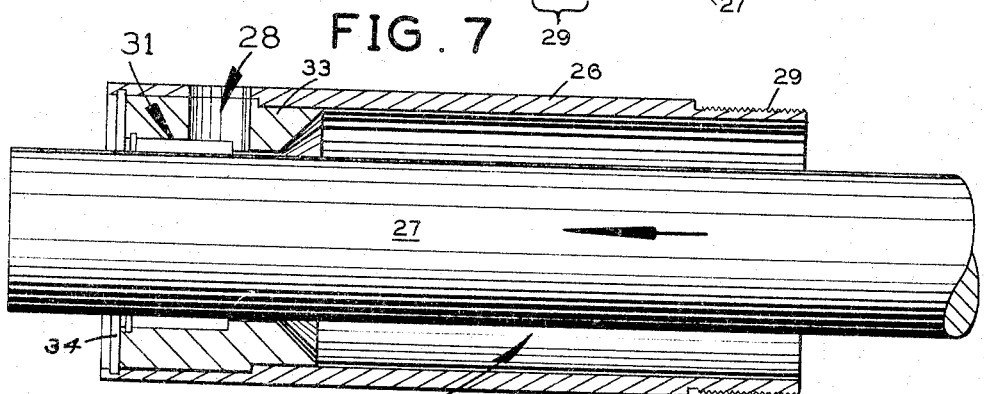
FIG. 8 is an enlarged cross sectional elevation of the adaptor shown in FIG. 7, taken through section line 8—8, thereof.

Since the aforesaid described feed devices are self operating, no external clamping or locking mechanisms are required. Referring to FIG. 7, a cylindrical housing 26 has an outside diameter $D_1$ equal to the diameter of the bar stock intended to be used in a particular screw machine, and as will hereinafter be described, the housing will properly feed bar stock 27 having a smaller diameter illustrated as $D_2$ when a cylindrical adaptor 33 is retained in one end thereof as shown in FIG. 8, by a snap ring 34. The housing 26 is provided with a transverse hole 28 for the use of a handle for engaging the threaded end 29 into mating threads in the machine feed barrel and for locking the adaptor in housing 26 by a pin, not shown.

Figure 9:
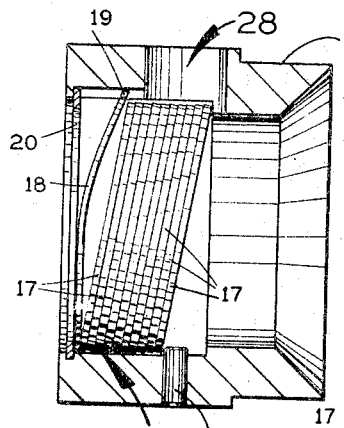
FIG. 9 is an enlarged cross sectional view of one end of the adaptor shown in FIG. 8, showing bar stock engaging elements in position.
Figure 10:
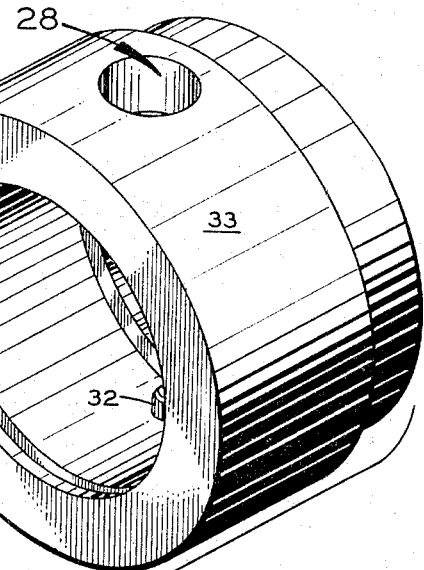
FIG. 10 is a perspective exploded view of the elements shown in FIG. 9.

Referring to the enlarged view in FIGS. 8 and 9, the adaptor has a coaxial bore to slidably retain bar stock 27 with a counter-bore 32 at one end thereof for receiving the discs 17, spring 18, and a snap ring 20, as shown in FIGS. 5 and 9. A pin 32 through the wall of the adaptor 33 projects normal to the axis thereof into the counter-bore 31 which serves to hold the discs 17 in the oblique position shown, as alternate to ring 15 which will hold and lock the bar 27 into sequential positions when moved in the direction of arrow shown in FIG. 8. It is obvious that the short adaptor and the housing therefor shown in FIGS. 7, 8 and 9, will be equally as effective in certain machines as the unitary housing previously described with the hole 28 used to accept a lock pin, not shown, to hold the adaptor in proper position.

Figure 11:
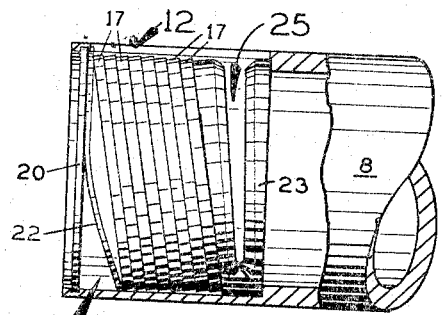
FIG. 11 is a fragmentary cross sectional view of a bar feeding mechanism of alternate construction.
Figure 12:
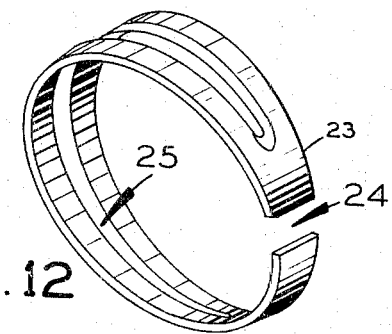
FIG. 12 is an enlarged perspective view of an element shown in FIG. 11.
Figure 13:
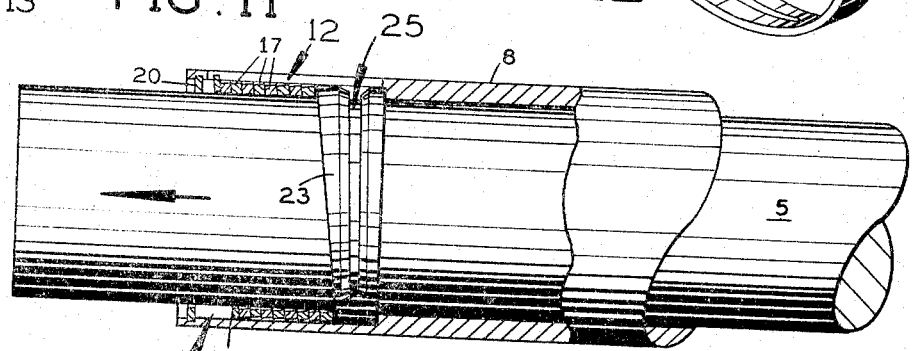
FIG. 13 illustrates a cylindrical bar stock positioned within the mechanism shown in FIG. 11.

FIGS. 11, 12 and 13 illustrate an alternate construction for machines in which the sequential feed movements toward a stop are positively driven without spring compensation. The counter bore 13 for this type machine is provided with an oblique ring 23 having an axial opening 24 in one side thereof and a transverse slot centrally positioned through the body of the ring. Like the previous apparatus a plurality of rings 17 are retained against the oblique side of ring 23 by circular spring 22 similar to spring 18 which spring is retained therein by a snap ring 20, as previously described. The difference of the width of the slit 25 in FIGS. 11 and 13 is exaggerated for illustrative purposes.

Figure 14:
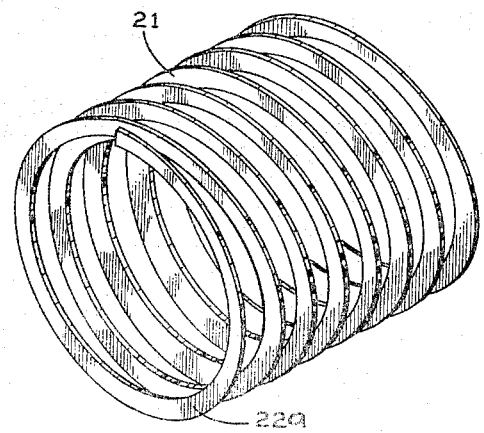
FIG. 14 is an enlarged perspective view of a single alternate element for replacing a plurality of elements shown in FIGS. 9, 10, and 11.

A somewhat simplified alternate internal construction is shown in FIG. 14, in which an edgewise wound helical spring 21 of steel wire having rectangular cross section and an inside diameter a predetermined dimension less than the diameter of the counter-bore 13 may be substituted for all rings 17. The outer-most end portion 22a of spring 21 is formed, as shown in FIG. 14, to apply inward tension to the entire spring when the latter is secured in the bore 13 by an internal snap ring 20.

An alternate construction comprehends a ring 23 positioned against the shoulder of counter-bore 13 for normally holding the inner ring 17 in the position shown in FIG. 11. From the preceding description, it is now apparent that when the round bar stock is inserted through casing 8 in the direction shown by arrow in FIG. 13, the bar will be locked against reverse motion by the action of spring 22 held in slightly resilient oblique position by ring 23 with opposite internal corners of the ring engaged with opposite sides of the bar with the inner ring 17 against ring 23. Thus, in the event the bar stock when moved by a positive displacement screw machine an excess distance against a fixed stop, the compression of the rings 17 against ring 23 will spring the latter inward a sufficient distance to release the grip of the rings 17 on the bar and thus prevent damage to the drive portion of the feed mechanism of the machine.

It is now apparent that the rings 17 may have central openings therein to fit bar stock of various cross sectional shape, such as rectangular, hexagonal or other geometric form, which rings may be interchanged in any of the housings described.

It is understood that certain other modifications in the construction, utilizing the features above described, are intended to come within the scope of the appended claims.

Having described my invention, I claim:

1. A mechanism for feeding bar stock of uniform cross section in an axial direction in sequential like distances in a metal cutting machine comprising a cylindrical housing means dimensioned and adapted to be secured in said machine for reciprocation thereby, a coaxial bore through said housing means for slidably guiding said stock therethrough, a counter-bore in one end of said housing means of predetermined diameter, means forming an oblique planar shoulder at the inner end of said counter-bore at a predetermined angle with respect to a plane normal to the axis of said bore, a plurality of like circular rings in said counter-bore canted against each other at said angle with the innermost one thereof positioned against said shoulder, each of said rings having a predetermined inside diameter greater than said first mentioned bore and a predetermined outside diameter less than the diameter of said counter-bore, circular spring means in said counter-bore positioned against the outermost one of said rings for urging the latter in like said canted position, fastening means secured in the outer end of said housing means for holding said spring means and said rings in tensioned position against said shoulder whereby said bar stock moved through said housing means in sequential predetermined distances in one direction will be prevented from reverse movement by the locking engagement of the opposite inner edges of said rings on said stock.

2. The construction recited in claim 1 including a channel in the wall of said counter-bore of uniform width and parallel the axis of said housing means, the said means forming an oblique shoulder having a projection extending from the periphery thereof slidably engaged in said channel for preventing the rotation of said means within said counter-bore about the said axis.

3. The construction recited in claim 1 including a channel in the wall of said counter-bore of uniform width and parallel the axis of said housing means, each of said concentric rings having a projection extending from the periphery thereof engaged in said channel for preventing the rotation of said rings within said counter-bore about said axis.

4. The construction recited in claim 1 including a channel in the wall of said counter-bore of uniform width and parallel the axis of said housing means,
the ends of said spring means formed to slidably engage said channel for preventing the rotation of said spring means in said counter-bore about said axis.

5. A mechanism for feeding bar stock of uniform cross section in an axial direction in sequential like distances in a screw machine comprising a cylindrical housing dimensioned and adapted to be secured in the feed barrel of said machine and for reciprocation thereby,
a coaxial bore through said housing for slidably guiding said stock in close proximity therewith,
a counter-bore in one end of said housing of a predetermined diameter forming a shoulder normal to the axis of said housing,
a canting ring positioned in said counter-bore with the inner edge thereof against said shoulder with a planar outer edge thereof formed at a predetermined angle with respect to the plane of said shoulder,
a plurality of circular rings in said counter-bore canted against each other at said angle with the innermost one thereof positioned against said planar outer edge,
each of said rings having a predetermined outside diameter greater than said first mentioned bore and a predetermined outside diameter less than the diameter of said counter-bore,
circular spring means in said counter-bore positioned against the outermost one of said rings for urging the latter in like canted position against the said outer edge of said canting ring,
a snap ring secured in an inner peripheral groove in said counter-bore and bearing against said spring whereby each sequential movement of said stock in one direction through said housing will be prevented from reverse movement by the engagement of the corners of the opposite inside edge of each of said rings on opposite sides of said stock.

6. A mechanism for feeding bar stock of uniform cross section in an axial direction in sequential like distances in a metal cutting machine comprising a cylindrical housing means dimensioned and adapted to be secured in said machine for reciprocation thereby,
a coaxial bore through said housing means for slidably guiding said stock therethrough,
a counter-bore in one end of said housing means of predetermined diameter,
means forming an oblique shoulder a predetermined angle from a plane normal the axis of said housing means at the inner end of said counter-bore,
a close edgewise wound helical spring formed of wire having a rectangular cross section positioned in said counter-bore with one end thereof positioned against said shoulder,
said spring having a predetermined inside diameter greater than said first mentioned bore and a predetermined outside diameter less than the diameter of said counter-bore,
fastening means secured within the outer end portion of said counter-bore for positioning against the opposite outer end of said spring for holding the latter in tensioned position against said shoulder with the coils thereof in a canted position whereby said bar stock moved through said housing means and said spring in sequential predetermined distances in one direction will be prevented from reverse movement by the locking engagement of the opposite inner edges of the inner periphery of said spring on said stock.

7. A mechanism for feeding bar stock of uniform cross section in an axial direction in sequential like distances in a screw machine comprising a cylindrical housing dimensioned and adapted to be secured in the feed barrel of said machine and for reciprocation thereby,
a coaxial bore through said housing for slidably guiding said stock in close proximity therewith,
a counter-bore in one end of said housing of a predetermined diameter forming a shoulder normal to the axis of said housing,
a plurality of circular rings positioned adjacent each other in said counter-bore,
each of said rings having a pair of rectangular inner and outer corners,
an abutment in one side of said counter-bore adjacent said shoulder for canting the innermost of said rings in a plane at a predetermined angle with respect to the plane of said shoulder,
each of said rings having a predetermined inside diameter greater than said first mentioned bore and a predetermined outside diameter less than the diameter of said counter-bore,
a circular spring means in said counter-bore positioned against the outermost of said rings for urging all rings against each other in said canted position with the opposite sides of the innermost one thereof against the said abutment and a portion of said shoulder opposite therefrom,
fastening means secured in the outer ends of said housing for holding said spring means and said rings in tensioned position against said shoulder and said abutment whereby said bar stock when moved through said housing means in sequential predetermined distances in one direction will be prevented from reverse movement by locking engagement of the opposite said inner corners of said rings bearing on opposite sides of said stock.

8. A mechanism for feeding bar stock of uniform cross section in a metal cutting machine comprising a cylindrical housing means dimensioned and adapted to be secured in said machine for reciprocation thereby,
a central axial bore through said housing means for slidably guiding said stock therethrough in one direction,
a counter-bore in one end of said housing means of predetermined diameter,
a canting ring positioned in said counter-bore with the inner edge thereof against said shoulder and with a planar outer edge thereof formed at a predetermined angle with respect to the plane of said shoulder,
said ring having a transverse slot therein for providing predetermined resilience to the outer edge thereof for displacement,
a plurality of circular rings in said counter-bore canted against each other at said angle with the innermost one thereof positioned against said planar outer edge,
each of said rings having a predetermined inside diameter greater than said first mentioned bore and a predetermined outside diameter less than the diameter of said counter-bore,
circular spring means in said counter-bore positioned against the outermost one of said rings for urging the latter in like canted position against the said outer edge of said canting ring,
a snap ring secured in an inner peripheral groove in said counter-bore and bearing against said spring whereby each sequential movement of said stock in a feed direction through said housing will move a predetermined small said displacement in reverse direction by the engagement of the corners of the opposite inside edge of each of said rings on opposite sides of said stock and the compression and restoration of the outer edge of said canting ring to return the stock a predetermined distance in opposite said feed direction.

9. A mechanism for feeding bar stock of uniform cross section in an axial direction in like sequential distances in a metal cutting machine comprising a cylindrical adaptor having an outside diameter dimensioned equal to the diameter of the stock for which the said machine was dimensioned and adapted to receive.

screw means for securing said adaptor in the stock bore of said machine, said adaptor having a coaxial bore therethrough for slidably guiding a bar stock of predetermined diameter therethrough, a counter-bore in one end of said adaptor of predetermined diameter, friction means retained in said bore for permitting the movement of bar stock therethrough in one axial direction and locking said stock against movement in opposite direction whereby bar stock of diameter smaller than the bar stock of the design parameter of said machine may be used.

10. The construction recited in claim 9 wherein the internal shape of the said friction means is formed to conform to a bar stock having a uniform cross section of like predetermined shape.

References Cited

UNITED STATES PATENTS

| 311,785 | 2/1885 | Reynolds | 226—167 |
| 3,112,056 | 11/1963 | Wright et al. | 226—167 X |
| 3,126,138 | 3/1964 | Onulak | 226—167 X |

FOREIGN PATENTS 521,304  5/1940  Great Britain.

M. HENSON WOOD, JR., *Primary Examiner.*

A. N. KNOWLES, *Examiner.*